US005705773A

United States Patent [19]
Smith

[11] Patent Number: 5,705,773
[45] Date of Patent: Jan. 6, 1998

[54] ELECTRICAL INSULATED BOOT

[75] Inventor: James E. Smith, Bethel Park, Pa.

[73] Assignee: Eaton Corporation, Cleveland, Ohio

[21] Appl. No.: 572,341

[22] Filed: Dec. 14, 1995

[51] Int. Cl.$^6$ ............................................. H02G 15/02
[52] U.S. Cl. ........................ 174/75 B; 174/85; 174/88 B
[58] Field of Search ............................ 174/75 B, 74 A, 174/75 R, 85, 88 B; 403/391, 393, 396; 439/210, 212, 213

[56] References Cited

U.S. PATENT DOCUMENTS

| | | | |
|---|---|---|---|
| 2,146,462 | 2/1939 | Bone | 247/1 X |
| 3,128,214 | 4/1964 | Lay | 156/55 X |
| 3,328,514 | 6/1967 | Cogelia | 174/113 R X |
| 3,816,171 | 6/1974 | Toth et al. | 117/212 X |
| 4,322,574 | 3/1982 | Bow et al. | 174/107 X |
| 4,366,201 | 12/1982 | Changani et al. | 428/157 X |
| 4,639,545 | 1/1987 | Pithouse et al. | 174/36 X |
| 4,658,054 | 4/1987 | Sinharoy et al. | 29/873 X |
| 4,939,512 | 7/1990 | Dennison et al. | 340/933 X |
| 5,212,350 | 5/1993 | Gebs | 174/102 R X |
| 5,212,351 | 5/1993 | Raines | 174/138 F X |
| 5,516,985 | 5/1996 | Merkel et al. | 174/74 A |

*Primary Examiner*—Kristine L. Kincaid
*Assistant Examiner*—Chau N. Nguyen
*Attorney, Agent, or Firm*—Martin J. Moran

[57] ABSTRACT

An improved design for an electrical insulated "through" boot for a bare joint area formed by two electrical conductors made of a molded member arranged longitudinally around the joint area and having a main body portion with opposed flap members. Each flap member is coextensive with the main body portion and has a distal end. When the molded member is arranged around the joint area, the distal end of each flap member is wrapped around each other in an overlapping manner to form a seal and to enclose the joint area. The ends of the boot can be secured in place by clamps or wire ties. The boot is easily removed without being destroyed for maintenance of the conductors and is therefore reusable. A further embodiment is for a tee boot which has a perpendicular leg which slips over the riser and which has the opposed flap members which are overlapped over the joint area of the bus bars, and a still further embodiment is for a spout boot which involves two pieces wherein one piece is inserted into the other for the overlapping feature around the joint area. Further embodiments provide an end boot and an end cap boot which also increase the creepage distance for the current leakage to prevent breakdown of the voltage source.

2 Claims, 7 Drawing Sheets

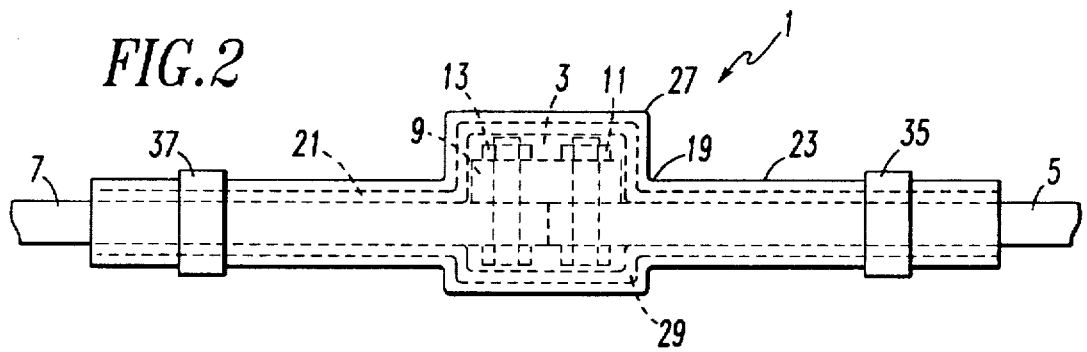
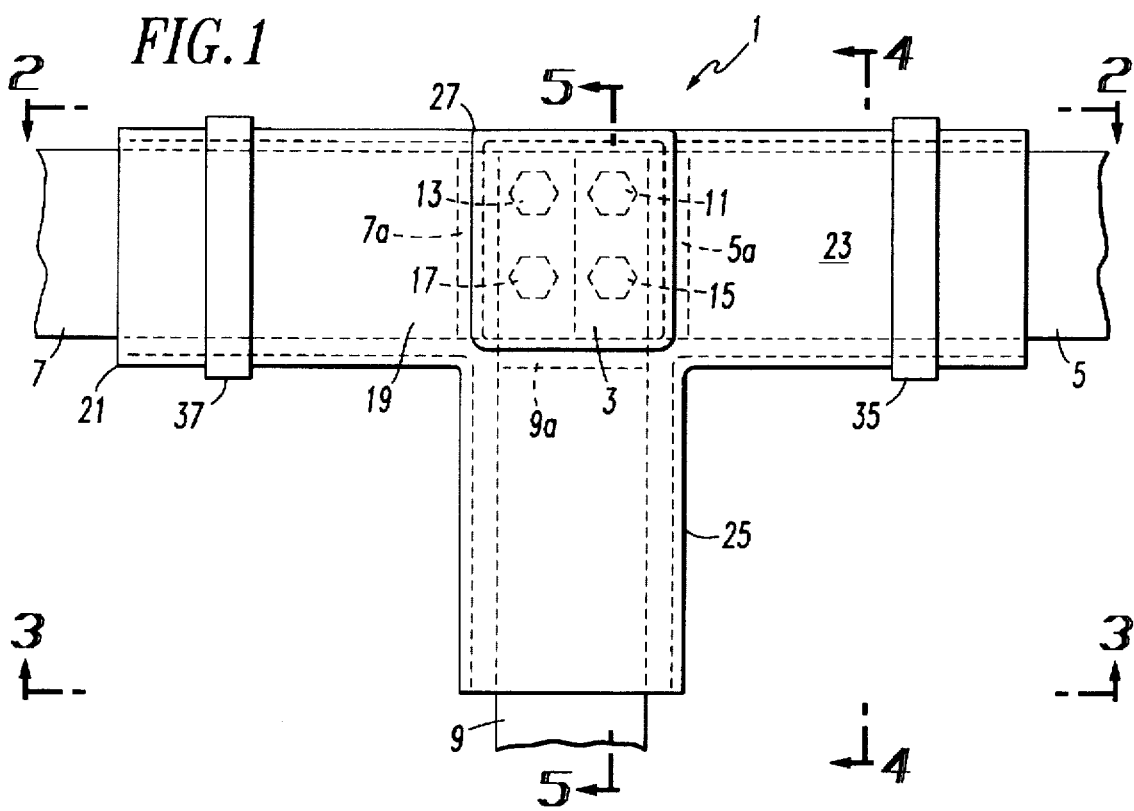
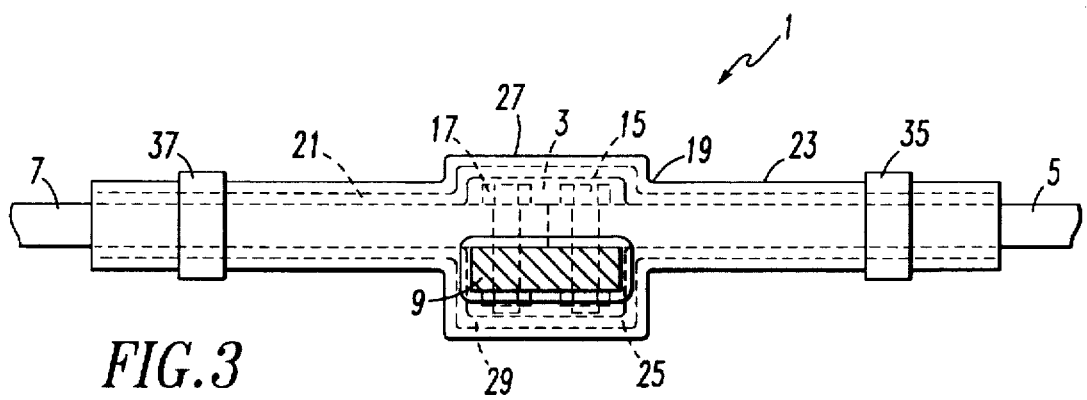

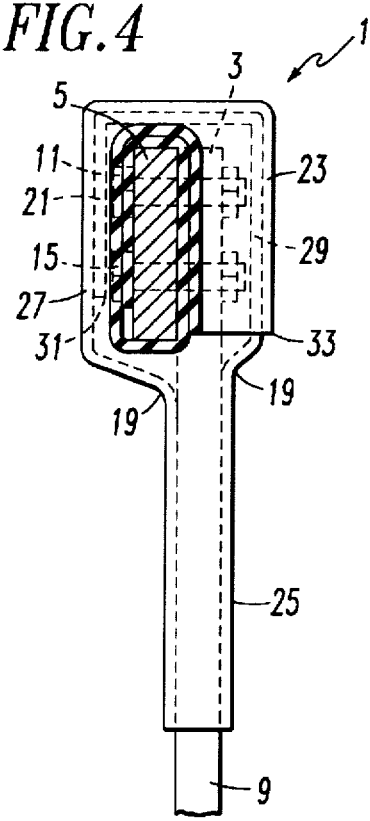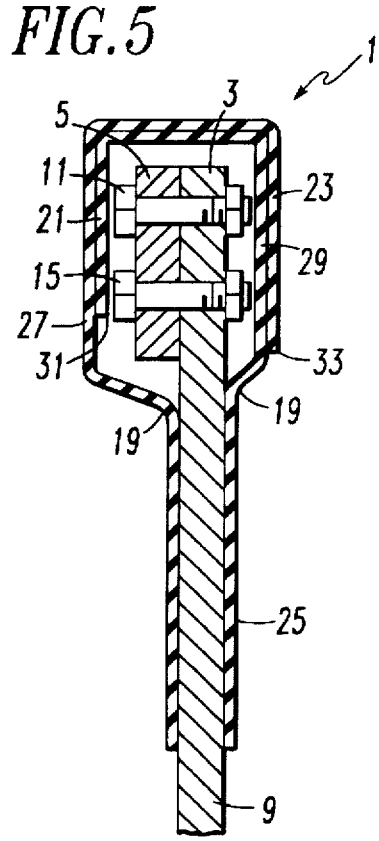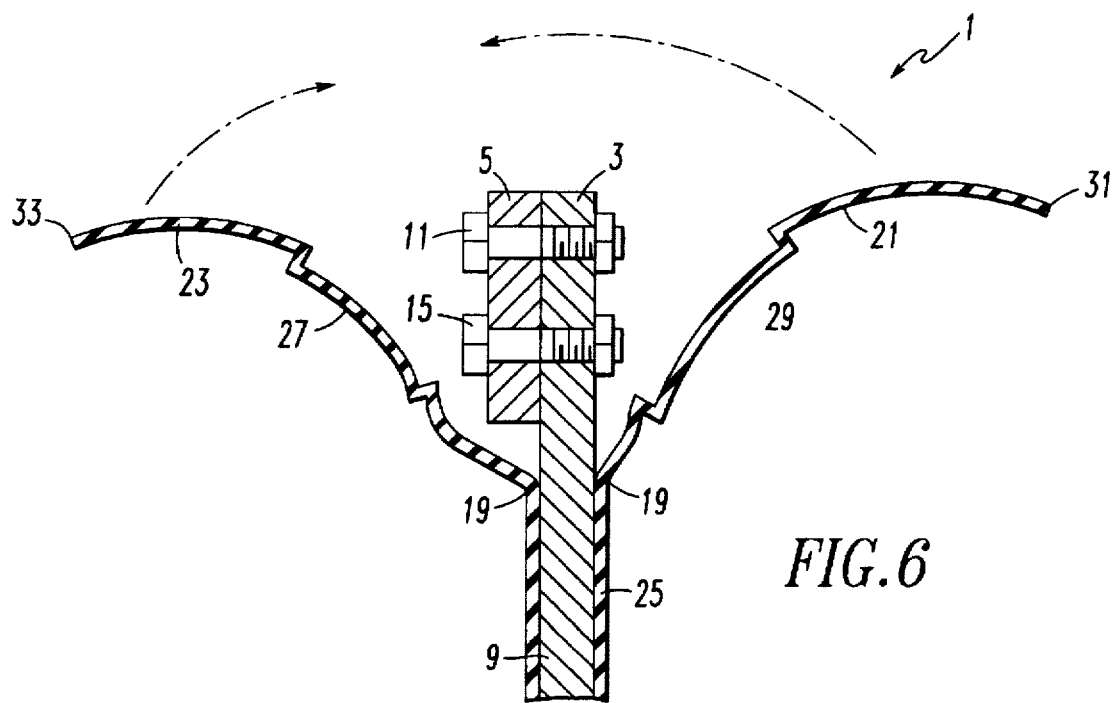

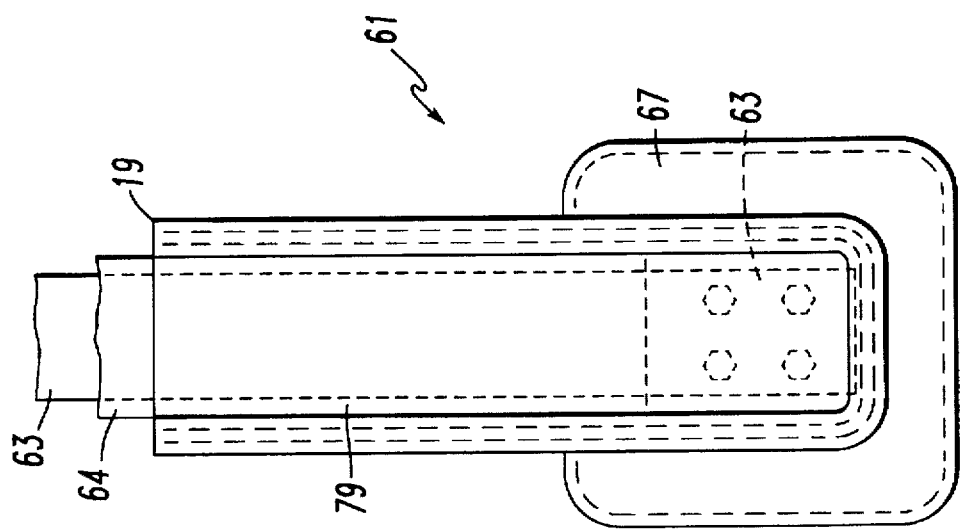
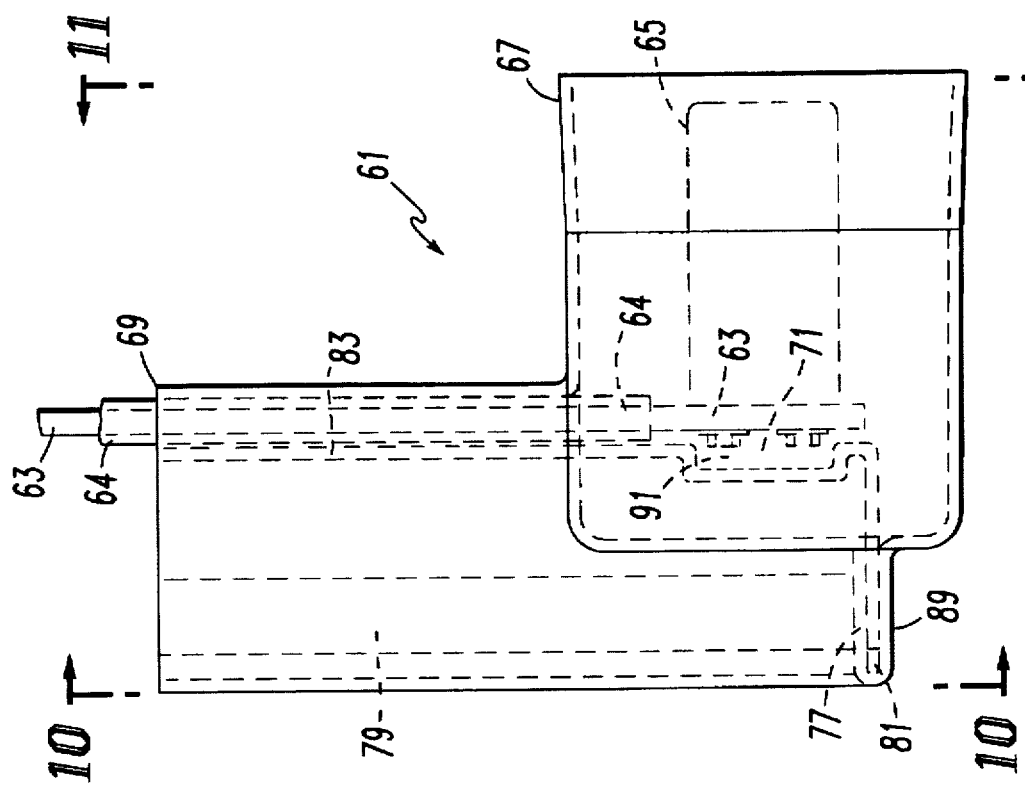

ELECTRICAL INSULATED BOOT

BACKGROUND OF THE INVENTION

1. Field of the Invention

The invention relates to an improved design for an electrical insulated boot for an electrical system. The boot is mounted around a joint area formed by a plurality of interconnected electrical conductors, such as bus bars, risers, and cables, or a combination thereof of the electrical system.

2. Description of the Prior Art

An electrical conductor such as a bus bar generally has an insulating layer enclosing it all along its length up to its ends where the electrical conductor is exposed so that it may be bolted to another electrical conductor to form a joint area. For safety reasons, these surfaces around a joint area can not be exposed when voltage is applied to the electrical conductors, and, therefore, an electrical insulating boot is generally mounted around the joint area.

Presently, at 38,000 volts there are several types of electrical insulated boots. One type of boot involves a mold which is placed around the joint area and a mold compound is poured into the mold in the field. When the mold compound solidifies, the mold is removed. Some disadvantages of this type of boot is that it requires a great deal of time and expense in that each time maintenance is required, the molded boot must be cut away from the joint area and replaced by another boot which is molded thereto in a similar fashion.

Another type of boot involves a solid compression type of boot which has open side portions so that the boot can be mounted around the joint area and the open side portions are brought together at one or more places in an abutting relationship to form a seam and are secured to each other by clamps or plastic screws which extend through the abutting side portions. In order to keep the leakage current from leaking through the seams, a gasket must be used therein. A seal is very difficult to achieve using this method.

These types of electrical insulating boots discussed hereinabove are generally used around a bare joint area formed by bus bars which have an insulating layer along its length up to the end of the bus bar which forms the bare joint area, the bare joint area meaning that the electrical conductor has no insulating layer in this joint area where several electrical conductors are joined.

In order to meet the American National Standards Institute (ANSI) C37.20.2 requirements, all insulating materials used to insulate bus bars, which include the insulating layer along the length of the bus bar as well as the insulated boot mounted around the joint area of the bus bars, must pass a foil test. In general, this foil test requires that a bus joint area consisting of maybe two insulated bus bars which are joined together and enclosed with an insulated boot be covered with aluminum foil or a conductive paint approximately one inch past each end of the insulated boot or paint. The aluminum foil or conductive paint is then grounded and system line-to-line voltage is applied between the end of the insulated bus bar and the aluminum foil or paint for one minute. The voltage source must not break down due to the current leakage travelling through the bare bus joint area under the boot to the grounded aluminum foil or conductive paint.

Any breakdown in the system may be attributable to the type of material which the boot is made of or to the amount of creepage distance from the end of the boot or through the seam, to the bare conductor at the bus joint area.

In order to pass the foil test, a minimum creepage distance is required along the insulated bus bar under the boot or along the seam to the bare bus bar. The minimum creepage distance is 1 to 2 inches for 5,000 and 15,000 volts; 4 to 5 inches for 27,000 volts; and 8 to 9 inches for 38,000 volts.

In the 5,000 to 27,000 volt switch gear, where the cell is 36 inches wide, the creepage distance from the bus joint to the side walls of the cell for all phases is sufficient to install a standard designed insulated boot. However, in the 38,000 volt switch gear, where the cell is 42 inches wide, there is not enough creepage distance from the bare bus joint of phases A and C to the side walls of the cell for the standard designed insulated boot to be used. At the same time, the standard designed insulated boots: 1) have a seam to fasten the boot to the joint; and 2) do not have enough creepage along the seam to the bare bus bar joint to pass the foil test. Although the solid compression/gasket type of boot and the poured-molded-solified type of boot will pass the foil test, it is very expensive to make.

There is a need, therefore, in the art to provide an electrical insulated boot which can be easily installed, removed, and replaced, and which still meets the foil tests for the ANSI C37.20.2 requirements and in which the boot is also reusable.

There is a further need in the art to provide an electrical insulated boot which is relatively inexpensive to manufacture, which can be used in electrical systems ranging higher than 35,000 volts with the required 8 to 9 inch creepage, and which essentially accommodates any kind of joint area with perhaps minor modifications.

SUMMARY OF THE INVENTION

The present invention has met the above-described needs. The present invention involves an improved design for an electrical insulated "through" boot comprising in one embodiment, a one-piece member having a main body portion with opposed integrally formed flap members. Each of the flap members is co-extensive with the main body portion and has a distal end. When the one-piece member is arranged longitudinally around the joint area, the distal end of each flap member is wrapped around the other in an overlapping manner such that the outer flap member snugly fits against and extends substantially over the entire surface of the inner flap member to form a tight seal and to enclose the joint area. A second embodiment involves an improved insulated "tee" boot which has a leg which slips over a riser and opposed flap members which wrap around to overlap and form a tight seal around the joint area. A third embodiment involves an improved insulated "spout" boot which has at least two pieces where a main piece has overlapping edges and a second piece is inserted into the overlapping edges of the main piece for forming a tight seal around the joint area.

Two further embodiments of the present invention involve an end boot and an end cap boot which can be used in conjunction with the main boots of the first three embodiments present invention discussed hereinabove to increase the creepage distance or to seal off the end of a main bus bar at the end of a lineup in order to prevent breakdown. The boots of the several embodiments may be made of a material with excellent dielectric properties, such as plastisols, for example, polyvinyl chloride, or may be made of any other flexible non-polyvinyl chloride material.

It is, therefore, an object of the present invention to provide an improved design for an electrical insulated boot which can be easily mounted and installed around the bare joint area of electrical conductors, which can be easily removed, and which is reusable.

A further object of the present invention is to provide an improved design for an electrical insulated boot which is economical both money-wise and time-wise and still passes the foil test requirements.

A still further object of the present invention is to provide an improved electrical insulated boot which includes overlapping means for forming a tight seal and enclosing a joint area formed by interconnecting a plurality of electrical conductors.

It is a further object of the present invention to provide an improved electrical insulated boot which provides the required creepage distance regardless of the voltage applied to the electrical system.

These and other objects of the present invention will be more fully understood and appreciated from the following description of the present invention upon reference to the illustrations appended hereto.

BRIEF DESCRIPTION OF THE DRAWINGS

FIG. 1 is an elevational view of a tee boot which is a first embodiment of the present invention;

FIG. 2 is a top plan view of the tee boot of FIG. 1 taken along lines 2—2 thereof;

FIG. 3 is a bottom plan view of the tee boot of FIG. 1 taken along lines 3—3 thereof with the riser in cross-section;

FIG. 4 is a sectional view of the tee boot of FIG. 1 taken along lines 4—4 thereof;

FIG. 5 is a vertical-sectional view taken along lines 5—5 of FIG. 1;

FIG. 6 is a vertical-sectional view of the tee boot of the present invention similar to that of FIG. 5 but showing the opposed flap members in an open non-overlap condition;

FIG. 9 is a side elevational view of a spout boot for a single bus bar and is a further embodiment of the present invention;

FIG. 10 is an elevational view taken along lines 10—10 of FIG. 9;

DETAILED DESCRIPTION OF THE PREFERRED EMBODIMENTS

Figure 7C:
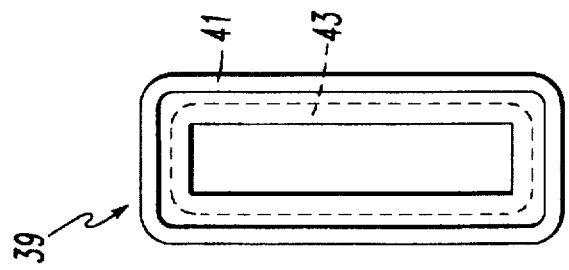
FIG. 7C is an end view taken along lines 7C—7C of FIG. 7A.

Referring first to FIGS. 1–6, a first embodiment of the present invention involves an electrical insulated boot commonly referred to as a "tee" boot and generally indicated at numeral 1 in these Figures. As FIG. 1 particularly shows, tee boot 1 is in a "T" configuration and is arranged around a bare joint area 3 formed by bus bars 5 and 7 and a riser 9, connected together to also form a "T." Bus bars 5 and 7 are arranged generally aligned relative to each other and are bolted by bolts 11, 13, 15, and 17 in a side-by-side relationship onto riser 9 as shown in phantom in FIG. 1 and which riser 9 extends generally perpendicularly relative to bus bars 5 and 7 to form the "T" configuration corresponding to tee boot 1. For clarity purposes, even though not shown, bus bars 5, 7 and riser 9 have generally an insulating layer which ends near the joint area 3 to expose or make bare the electrical conductor part of bus bars 5, 7 and riser 9.

Referring to FIGS. 1–6, tee boot 1, preferably, is fabricated of a flexible material through a molding process well-known to those skilled in the art. Tee boot 1 comprises a one-piece member having a main body portion 19 and opposed flap members 21 and 23 best shown in FIGS. 4, 5 and 6, which are coextensive with main body portion 19, and a leg member 25 which is also co-extensive with main body portion 19 and which extends generally perpendicularly relative to opposed flap members 21 and 23. Preferably, leg member 25 has no seams and has a continuous periphery forming a relatively flat annulus as shown best in FIG. 3 for enclosing riser 9 as shown in FIGS. 1, and 3–6, more about which will be discussed hereinbelow.

With particular reference to FIGS. 1–5, each opposed flap member 21,23 of main body portion 19 has a slightly projecting central portion 27 and 29 located near leg member 25 which corresponds to and cooperates with each other to receive the joint area 3 formed by bus bars 5, 7, and 9. As best shown in FIGS. 1 and 2, central portions 27 and 29 are generally rectangular shaped and are formed in the molding process of tee boot 1. With regard to FIGS. 1–5, when tee boot 1 is assembled around joint area 3, projecting central portion 27 is located on top of joint area 3 and central portion 29 is located beneath joint area 3.

As best shown in FIG. 6, opposed flap members 21 and 23 each have a distal end 31 and 33 respectively, which are overlapped relative to each other as shown best in FIGS. 4 and 5 to enclose bare joint area 3. For this overlapping relationship of FIGS. 4 and 5, opposed member 21 is first wrapped around joint area 3 followed by opposed member 23 being wrapped around member 21, whereby opposed member 21 becomes the inner member and opposed member 23 becomes the outer member. Both opposed members 21 and 23 extend the length of main body portion 19 along bus bars 5 and 7 as shown in FIGS. 1–3. As best shown in FIGS. 4 and 5, both opposed members 21 and 23 substantially extend over each other to enclose joint area 3. As best shown in FIGS. 1–3, this overlapping relationship of opposed members 21 and 23 exist substantially along the entire length of main body portion 19 of tee boot 1.

Preferably, tee boot 1 is made of a flexible material having excellent dielectric properties, such as a plastisol, as for example, polyvinyl chloride (PVC), but can be made of any flexible non-polyvinyl chloride material. The flexible material allows the opposed members 21,25 to fit snugly against each other including the projecting central portion 27,29 when members 21,25 overlap as shown in FIGS. 4 and 5 to form a tight seal around and to enclose joint area 3.

With particular reference to FIG. 1, bus bars 5 and 7 and riser 9 have an insulating layer (not shown) which may generally terminate near the joint area 3 as is indicated by the dash lines at 5a, 7a, 9a, respectively, and which-layer is overlapped a substantial amount by tee boot 1 when tee boot 1 is mounted around joint area 3.

In mounting tee boot 1 around joint area 3 with particular reference to FIG. 6, leg member 25 can first be slipped onto the end of riser 9, with opposed flap members 21,23 being spaced away from each other as shown in FIG. 6. Bus bars 5 and 7 can then be bolted to riser 9 followed by opposed flap member 21 being brought around joint area 3, followed by opposed flap member 23 being brought around opposed member 21 and joint area 3. Tee boot 1 can be securely held in place by plastic wire ties 35,37 which can be secured there around, and which wire ties are available in the marketplace and well known to those skilled in the art. Clamps can be used instead of wire ties 35,37.

The projecting central portions 27 and 29 of opposed flap members 21, 23 when in the overlapped manner of FIGS. 4 and 5 over joint area 3 provide enough space to accommodate bolts 11, 13, 15, and 17, and riser 9 in their assembled form of FIGS. 4, 5, and 6. Thereafter, the thickness of opposed flap members 21,23 is reduced to abut against the insulating layer of bus bars 5 and 7 at each end of opposed members 21,23 away from bare joint area 3.

In effect, opposed members 21,23 when overlapped or wrapped around each other form a tight seal. Since members 21,23 are wrapped around joint area 3, the leakage current from bus bars 5, 7 and riser 9 is forced to creep from the outer distal end 33 of outer flap member 23 over the entire surface of inner flap member 21 before it can reach bus bars 5, 7 or riser 9.

This creepage distance from distal end 33 of outer flap member 23 to the distal end 31 of inner flap member 21 may be about 8 to 9 inches, which is the required distance to prevent a breakdown of the voltage source for about a 38,000 volt switch gear system. Compare this to previous insulated boot designs, where a seam at the bare bus bar joint area would provide a creepage distance of only about 2 to 3 inches, which for a 38,000 volt switch gear system would inevitably cause a breakdown of the voltage source.

The length of each end of opposed members 21, 23 when considered from the center of each projecting central portion 27, 29 and outwardly to its terminus along bus bars 5,7 with particular reference to FIG. 1, may be about 8 to 9 inches in order to provide the required creepage for an electrical system of about 35,000 to 38,000 volts. For different voltages, this length of opposed members 21, 23 can vary. For example, it may be about 1 to 2 inches for 5,000 to 15,000 volts and about 4 to 5 inches for about 27,000 volts.

For maintenance of bare joint area 3, tee boot 1 can be easily opened by removing wire ties 35 and 37 and separating opposed members 21 and 23. From this, it can be appreciated that tee boot 1 is reusable whereby it can be closed again after maintenance and then secured again.

Figure 14:
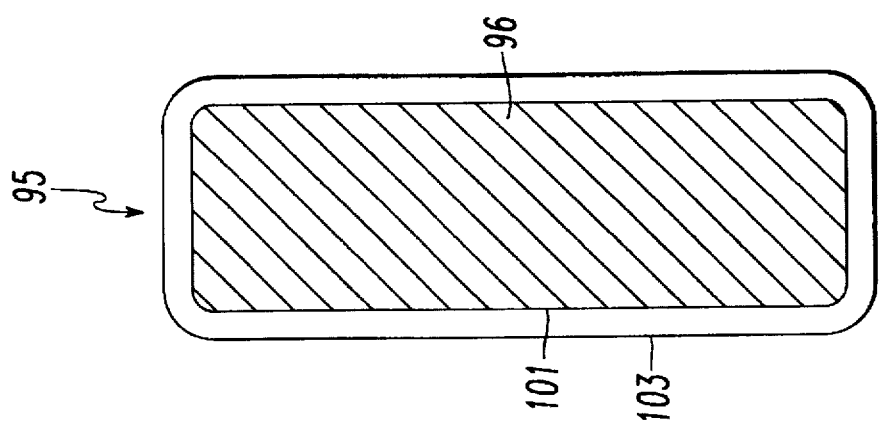
FIG. 14 is a end view taken along lines 14—14 of FIG. 13.
Figure 13:
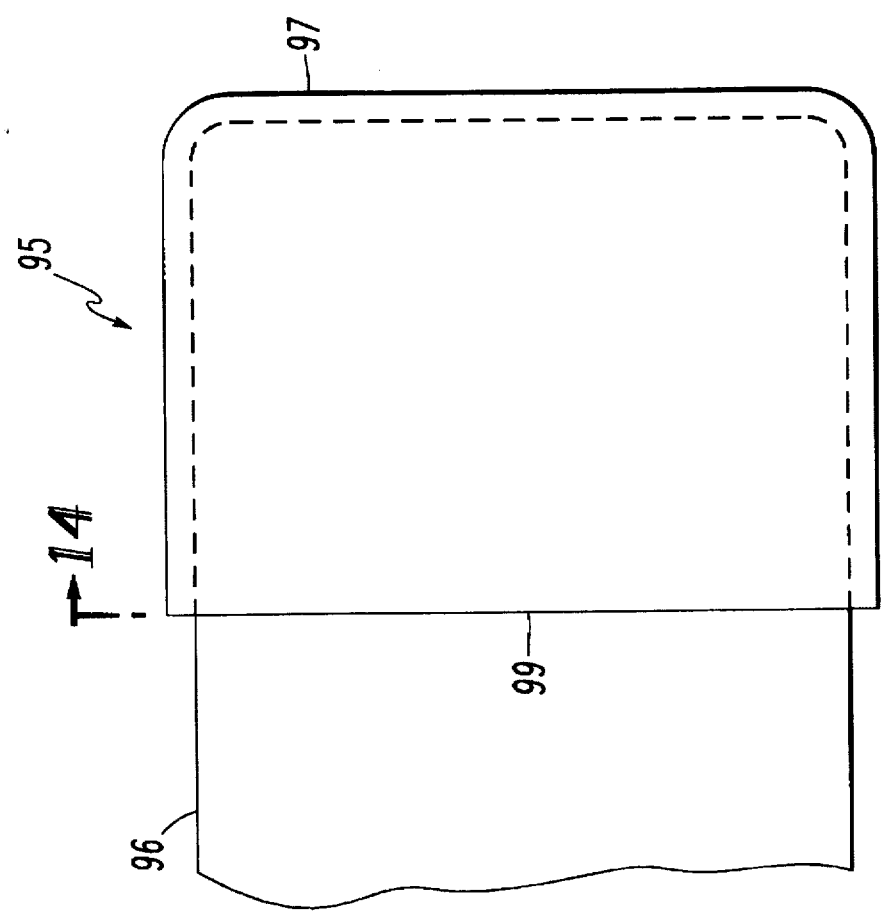
FIG. 13 is an elevational view of an end cap boot which can be mounted at the end of a bus bar and which is a further embodiment of the present invention.

If additional creepage is needed for the tee boot 1 of FIGS. 1–6 regardless of whether the length of opposed members 21 and 23 is of the dimensions in the preceding paragraph for the different voltages, then the present invention provides for an end boot 39 as shown in FIGS. 7A, 7B, 7C, and 7D and as being mounted around the tee boot 1 of FIGS. 1–6, or an end cap boot 95 of FIGS. 13 and 14.

Figure 7A:
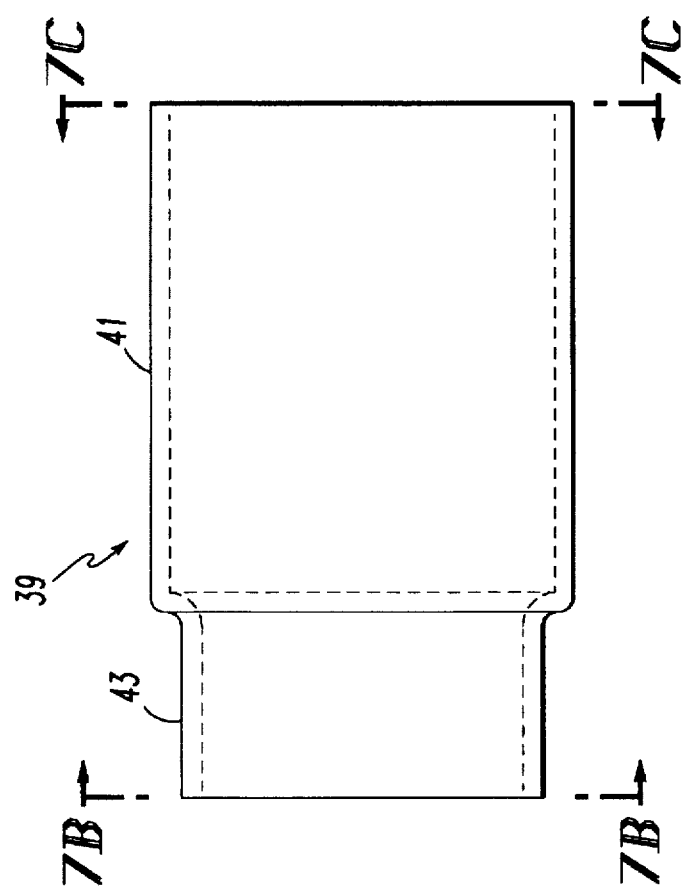
FIG. 7A is an elevational view of an end boot which is a further embodiment of the present invention.
Figure 7B:
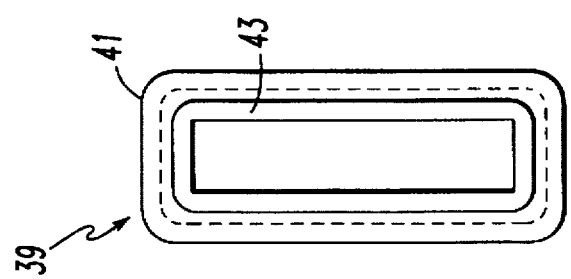
FIG. 7B is an end view taken along lines 7B—7B of FIG. 7A.
Figure 7D:
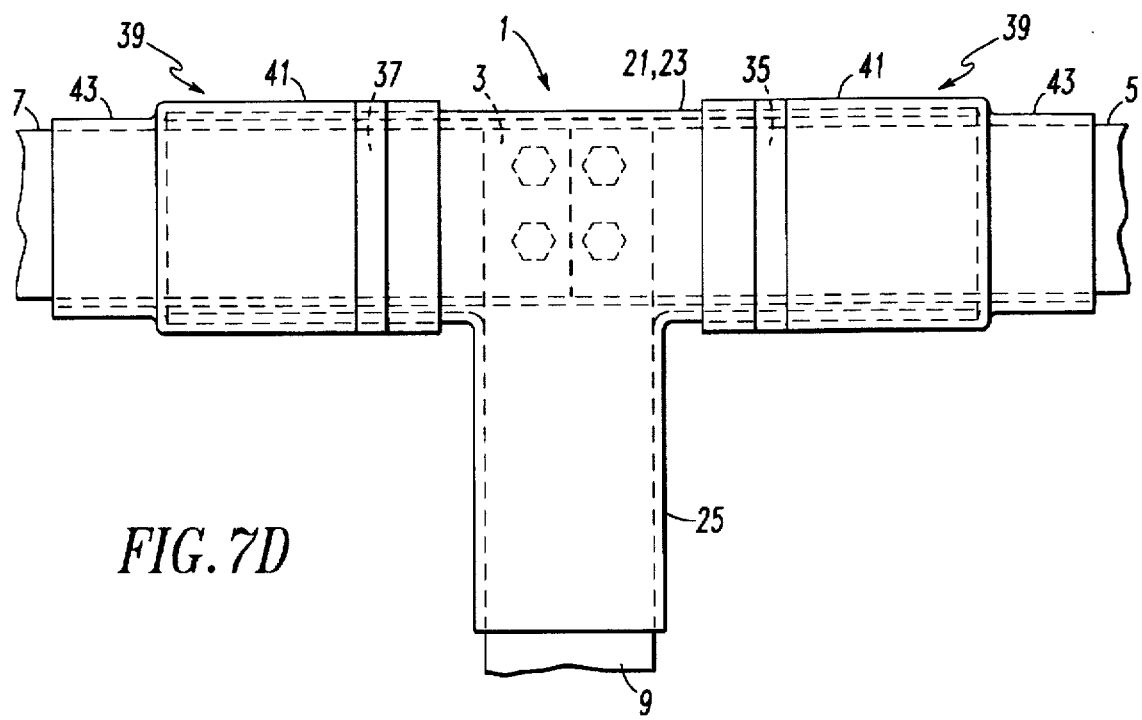
FIG. 7D is an elevational view of the end boot of FIGS. 7A-7C shown as being used with a tee boot of FIG. 1 for exemplary purposes.

With particular reference to FIGS. 7A, 7B, and 7C, end boot 39 is a one-piece molded member with an enlarged annular portion 41 and a reduced annular portion 43. As best shown in FIG. 7D, enlarged portion 41 fits over and receives opposed members 21 and 23 when they are in their assembled form around bus bars 5 and 7, and reduced portion 43 fits snugly against the insulating layer (not shown) of bus bars 5,7.

Preferably, end boot 39 is made of a flexible material with excellent dielectric characteristics, such as a plastisol, as for example, polyvinyl chloride.

Figure 8:
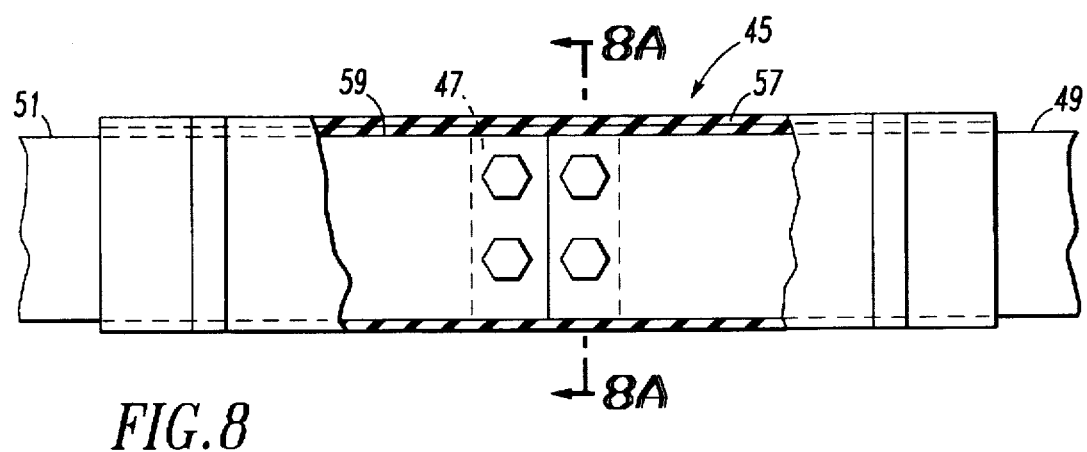
FIG. 8 is an elevational view of a through-boot of a further embodiment of the present invention.
Figure 8A:
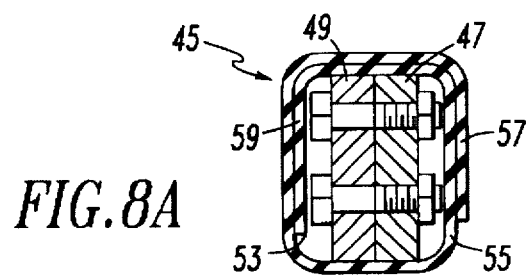
FIG. 8A is a vertical-sectional view taken along lines 8A—8A of FIG. 8.
Figure 11:
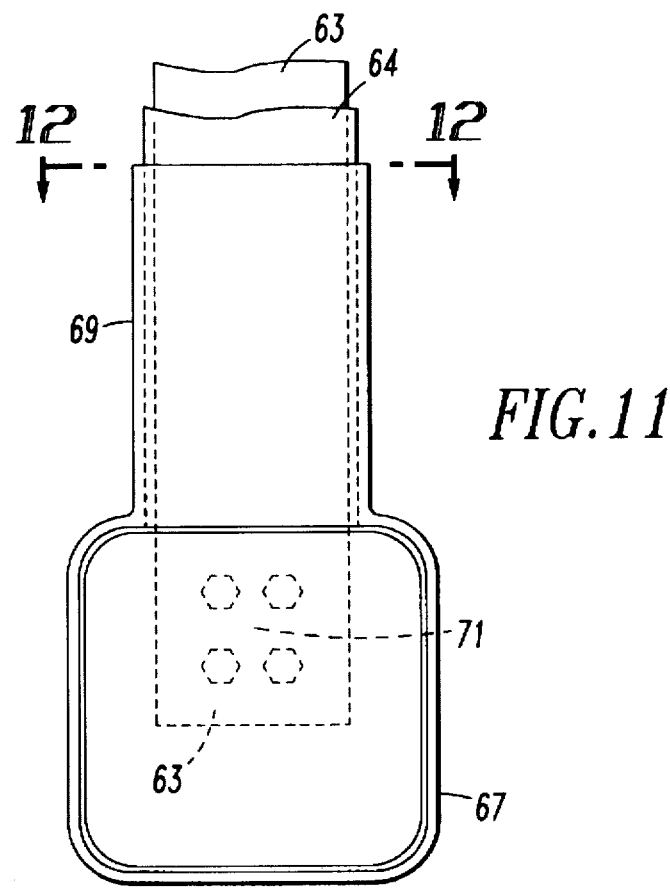
FIG. 11 is an elevational view taken along lines 11—11 of FIG. 9.

FIGS. 8 and 8a show a further embodiment of the present invention which involves an electrical insulated boot commonly referred to as a "through" boot and generally indicated at number 45. As shown in FIGS. 8 and 8a, through boot 45 is arranged around a bare joint area 47 formed by the bare electrical conductor part of bus bars 49 and 51 which bus bars 49, 51 also have an insulating layer (not shown for clarity purposes) which ends near the joint area 47. Bus bars 49 and 51 are arranged in alignment relative to each other and have a bare end portion which overlaps with each other and is bolted thereto as shown in the dot-dash lines of FIG. 8.

Through boot 45 is similar to tee boot 1 of FIGS. 1 through 6, the only difference being that instead of having leg member 25, through boot 45 has a continuous wall all along the length of through boot 45 as shown in FIG. 8A. Aside from this, through boot 45 is constructed and functions similarly to tee boot 1. When mounted around bare joint area 47, the continuous seam portion near projecting central portions 53,55 of opposed members 57,59 for accommodating joint area 47 is held in place followed by opposed members 57, 59 being overlapped in the manner discussed hereinabove for the tee boot 1 of FIGS. 1–6, and as particularly shown in FIG. 8A.

FIGS. 9, 10, 11, and 12 show a further embodiment of the present invention which involves an electrical insulated boot, commonly referred to as a "spout" boot generally indicated at number 61. As shown in FIG. 9, spout boot 61 is arranged around a bare joint area formed by an insulated bus bar 63 and an electrical conductor 65, where bus bar 63 and conductor 65 are arranged generally perpendicularly relative to each other.

Spout boot 61 comprises two outwardly projecting receptacle members 67 and 69 which are integrally formed and which extend in about a 90° angle relative to each other so that receptacle member 67 receives conductor 65 and receptacle member 69 receives bus bar 63 for their interconnection relative to each other to form a bare joint area 71 for these electrical conductors 63, 65 as best shown in FIG. 9. The insulating layer 64 (FIG. 9) for bus bar 63 terminates near bare joint area 71 to bare the electrical conduction part of bus bar 63.

Figure 12:
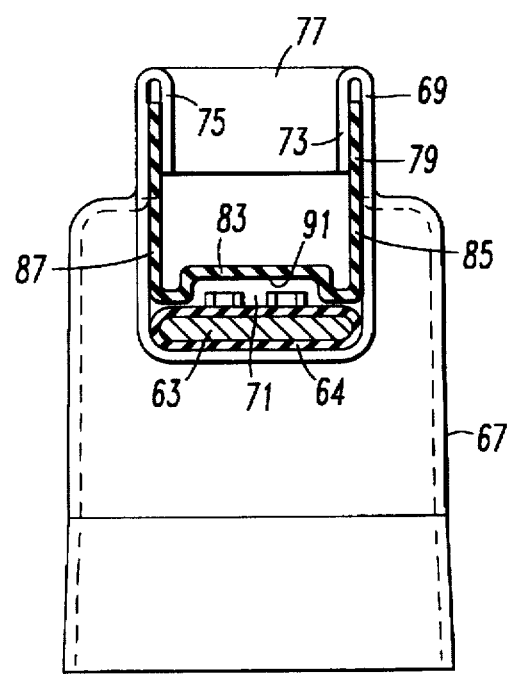
FIG. 12 is a top view taken along lines 12—12 of FIG. 11.

Essentially, both receptacle members 67 and 69 are generally rectangular-shaped annulus members and are integrally formed in a stepped fashion with no open seams therebetween. Being that spout boot 61 is formed, preferably, through a molding process, receptacle member 67 takes on the same configuration as member 65 so that it fits snugly onto the one end of conductor 65 as shown best in FIG. 9. Receptacle member 69 has overlapping side edge portions 73 and 75 (FIG. 12) and bottom edge portion 77 (FIG. 9) extending therearound in a U-shape configuration and overlapping an insert member 79 which also has a U-shape configuration which corresponds to the open-end U-shape configuration of receptacle member 69. Receptacle member 69 receives bus bar 63, as best shown in FIG. 12. Insert member 79 is generally longitudinal and has a bottom wall 81 (FIG. 9), a rear wall 83 (FIGS. 9 and 12), and sidewalls 85 and 87 (FIG. 12). As best shown in FIG. 9, rear wall 83 of insert member 79 abuts against bus bar 63 with sidewalls 85 and 87 of insert member 79 abutting against the inner walls of receptacle member 69 as shown best in FIG. 12. Bottom wall 81 of insert member 79 abuts against a corresponding wall of receptacle member 69, as shown at numeral 89 in FIG. 9. In this arrangement of FIG. 12, insert member 79 is secured in receptacle member 69 by a portion of sidewalls 85 and 87 with bottom wall 81 being inserted behind the overlapping edge portions 73,75,77 of receptacle member 69, shown in FIGS. 9 and 12. As also shown in FIGS. 9 and 12, insert member 79 has an indented well portion 91 which is generally rectangular shaped for receiving the bolts.

Preferably, similar to tee boot 1 and through boot 45, spout boot 61 is fabricated through a molding process well known in the art, and of a flexible material with excellent dielectric properties such as a plastisol, as for example, polyvinyl chloride, but can also be a flexible non polyvinyl chloride.

In mounting spout boot 61 onto member 65, receptacle member 67 is mounted therearound. Bus bar 63 is received in receptacle member 69 and bolted to electrical conductor 65, followed by insert member 79 being inserted into receptacle member 69 and abutting against bus bar 63 and arranged beneath the overlapping edge portions 73, 75,77 of receptacle member 69. Removal of spout boot 61 involves the removal of insert member 79 and bus bar 63 from receptacle member 69, followed by removal of spout boot 61 from member 67.

It can be appreciated that spout boot 61 comprises at least two pieces whereby insert member 79 is overlapped by the edge portions 73,75,77 of member 69 of spout boot 61.

FIGS. 13 and 14 show a further embodiment of the present invention which features an end cap boot 95. End cap boot 95 can generally be used at the end of a bus bar or electrical conductor 96 where it is made to slip over the end of a main boot, such as the tee boot 1 of FIGS. 1–6 in a manner similar to that of end boot 39, the through boot 45 of FIGS. 8–8A, or the spout boot 61 of FIGS. 9–12.

End cap boot 95 is preferably a one-piece molded annular member with a closed end wall 97 and an open-ended wall 99 showing an inner diameter indicated at numeral 101 and an outer diameter indicated at numeral 103 in FIG. 14. As an example, end cap boot 95 will fit snugly over and against opposed members 21 and 23 of the tee boot 1 of FIGS. 1–6. End cap boot 95 is preferably made of a flexible material with excellent dielectric characteristics,such as a plastisol, as for example, polyvinyl chloride, and could be made to be removable or permanent, depending on its particular application. End cap boot 95, as with the other boots described herein, is meant to be used to increase the creepage distance necessary around a bare electrical conductor joint area to prevent the leakage current from reaching the electrical conductors and therefore prevent a breakdown of the voltage source, as explained hereinabove.

End cap boot 95 preferably is made of a flexible material such as a plastisol, as for example, polyvinyl chloride.

If a main boot, such as tee boot 1, through boot 45, or spout boot 61 needs to be inserted into a confined area, such as that for a bus support, which does not allow such main boot in its original form to be installed therein, then the main boot can be cut off an appropriate length and end cap 95 can be substituted to replace the cut-off section of the main boot.

From the above, it can be appreciated that the present invention provides an electrical insulated boot for a bare joint area which is easily mounted, installed, removed and reusable, and which forms a tightly sealed area around the joint area formed by the electrical conductors to pass the foil test requirements. Further, it can be appreciated that the several embodiments of the present invention provide a means whereby the creepage distance for the current leakage is increased to prevent a breakdown for the voltage source, which increase in creepage distance becomes extremely necessary when the switch gear applies a higher voltage, such as 35,000 to 38,000 volts.

The invention having been disclosed in Connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An electrical insulator for a bare joint area formed by a plurality of interconnected electrical conductors connected to a voltage source, comprising:

main boot means arrangeable around said bare joint area for forming a seal and enclosing said bare joint area when said main boot means is assembled over said bare joint area to provide for a predetermined creepage distance for current leakage to prevent breakdown of said voltage source;

wherein said main boot means comprises at least two separate members, one of said two members inserted into the other of said two members; and wherein said main boot means is a spout boot.

2. An electrical insulator for a bare joint area formed by a plurality of interconnected electrical conductors connected to a voltage source, comprising:

main boot means arrangeable around said bare joint area for forming a seal and enclosing said bare joint area when said main boot means is assembled over said bare joint area to provide for a predetermined creepage distance for current leakage to prevent breakdown of said voltage source;

wherein said main boot means is a spout boot, and wherein said electrical conductors are arranged at an angle, said spout boot comprising:

at least two projecting receptacle members which are integrally formed and arranged at an angle relative to each other to receive one of said electrical conductors;

one of said two projecting receptacle members being in a U-shape configuration and having flap edges; and an insert member being received in said U-shaped configuration of said one of said two projecting receptacle members and being retained therein by said flap edges thereof to provide said predetermined creepage distance.

* * * * *